March 6, 1945. V. R. FITZSIMMONS 2,370,650
DOUGHNUT CUTTER
Filed June 12, 1944

Inventor
VERLYN R. FITZSIMMONS,

By Clarence A. O'Brien
and Harvey B. Jacobson
Attorneys

Patented Mar. 6, 1945

2,370,650

UNITED STATES PATENT OFFICE 2,370,650

DOUGHNUT CUTTER

Verlyn R. Fitzsimmons, St. Paul, Minn., assignor of one-half to Howard D. Allworth, St. Paul, Minn.

Application June 12, 1944, Serial No. 539,905

3 Claims. (Cl. 30—301)

This invention relates to new and useful improvements in doughnut cutters or dough cutters for cutting dough into various shapes preparatory to baking.

The principal object of the present invention is to provide a dough cutter, such as a doughnut cutter, having resilient means for absorbing some of the shock and effort of cutting dough by hand cutters.

Other objects and advantages of the invention will become apparent to the reader of the following description.

In the drawing—

Figure 1:
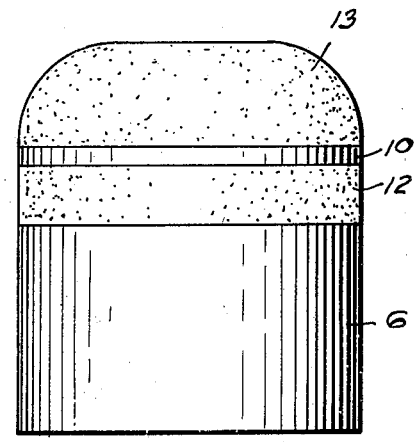
Figure 1 is a side elevational view.
Figure 2:
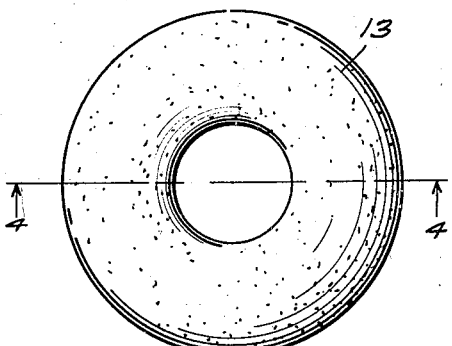
Figure 2 is a top plan view.
Figure 3:
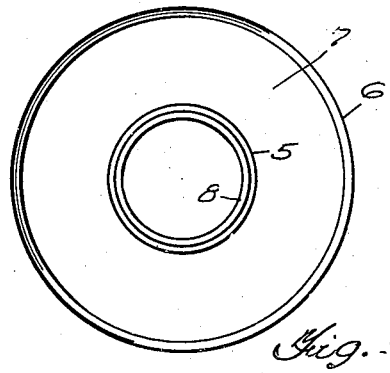
Figure 3 is a bottom plan view.
Figure 4:
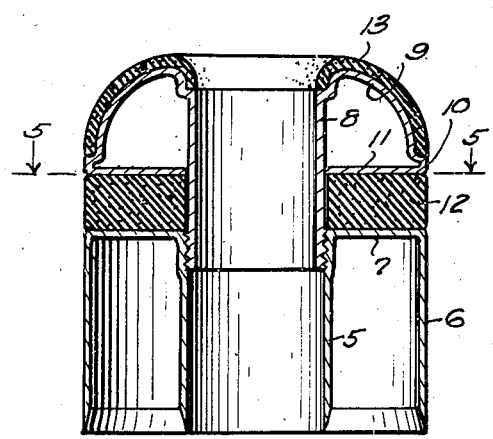
Figure 4 is a vertical section taken on the line 4—4 of Figure 2.
Figure 5:
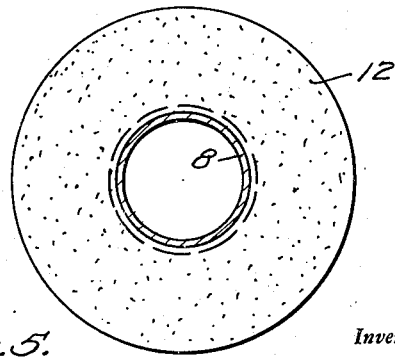
Figure 5 is a section taken on the line 5—5 of Figure 4.

Referring to the drawing wherein the same numerals designate the same parts, it can be seen that the cutter is made up of a pair of annular cutting blades 5, 6, the same being spacially and concentrically arranged and preferably of one piece construction, this plate assembly having a top 7 and the upper end of the cutter 5 being internally threaded to receive the lower externally threaded end of a hollow neck 8 which depends from a hollow knob-like structure 9 which has a narrow outward bulge defining a shoulder 10 at its lower portion. This hollow knob-like structure 9 has a bottom 11 which opposes the top 7 of the cutter assembly. A collar 12 of some suitable resilient material such as rubber has the neck 8 disposed through a central opening thereof and is interposed between the top 7 of the cutter assembly and the bottom 11 of the knob-like structure 9.

A ring-like covering 13 is provided for the outer surface of the knob-like structure 9 and is suitably secured thereto. The covering 13 acts as a cushion for the palm of the operator's hand.

Of course, there will be some flexibility in the materials of the neck 8 and knob-like structure 9 which can act against the cushion ring 12 to absorb some of the shock in the effort of cutting doughnuts and other forms of dough.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A doughnut cutter comprising a pair of spaced and concentric blades, a top for the blades, a knob-like structure provided with a depending neck disposed into the innermost blade and cushioning means between the knob-like structure and the top of the blades.

2. A doughnut cutter comprising a pair of spaced and concentric blades, a top for the blades, a knob-like structure provided with a depending neck disposed into the innermost blade and cushioning means between the knob-like structure and the top of the blades, and a resilient covering for the knob-like structure.

3. A doughnut cutter comprising a pair of spaced and concentric blades, a top for the blades, a knob-like structure provided with a depending neck disposed into the innermost blade and cushioning means between the knob-like structure and the top of the blades, and a detachable connection between the neck and the innermost blade.

VERLYN R. FITZSIMMONS.